Patented Aug. 26, 1952

2,608,591

UNITED STATES PATENT OFFICE 2,608,591

SUBSTITUTION CHLORINATION OF AROMATIC COMPOUNDS WITH LIQUID CHLORINE

Francis Earl Lawlor, Niagara Falls, N. Y., assignor to Niagara Alkali Company, New York, N. Y., a corporation of New York No Drawing. Application December 7, 1948, Serial No. 64,046

9 Claims. (Cl. 260—650)

This invention relates to a process of chlorinating aromatic compounds and compounds having an aromatic character, in which nuclear hydrogen is substituted by chlorine.

The known method of chlorinating to a high chlorine content is to treat the compound to be chlorinated with gaseous chlorine or to dissolve the compound in a solvent inert to chlorine, such as carbon tetrachloride or sulfuryl chloride, and then to treat the solution with gaseous chlorine. By this method it is difficult to obtain chlorinated aromatic compounds having a high chlorine content without resorting to high temperatures and other inconvenient operating conditions. Such high temperatures cause side reactions or decomposition in the case of certain compounds, or sublimation of the chlorinated compounds. This is particularly true as the chlorine content approaches the maximum.

A typical example which illustrates the difficulties of prior art procedures is the production of pentachlorotoluene, which has a melting point of over 220° C. While it is not difficult to chlorinate toluene up to the trichloro stage by prior art processes, the introduction of further chlorine, particularly the substitution of 5 chlorine atoms on the nucleus, is exceedingly difficult, because the temperature required to keep the product liquid is so high as to decompose the compound and split off the side chain. Thus, toluene chlorinated under high temperature conditions results in the removal of the methyl group to yield hexachlorobenzene. Similar problems are involved with the production of other chlorinated methyl benzenes, such as tetrachloroxylene which has a melting point above 220° C., and with the chlorination of mesitylene and durene which give high melting chlorinated compounds. Many aromatic mixtures can be strenuously chlorinated with gaseous chlorine by the conventional processes to yield hexachlorobenzene as the major component, since side chains will not withstand high temperature chlorination.

This state of the art is illustrated by Beilstein and Kuhlberg, Ann. 150, 288–290, 298–299 (1869) where mixed trichlorotoluenes were chlorinated with antimony chloride as a catalyst and further processed to yield only ten percent pentachlorotoluene. PB report No. 792 (Office of Publication Board, U. S. Dept. of Commerce) states that the defects of this method are the loss of the catalyst due to the high temperature required to keep the mass molten and the necessity of fractionally distilling the pentachlorotoluene with resultant charring and loss of product.

An alternative is to use a solvent such as carbon tetrachloride or sulfuryl chloride, but this is undesirable because of problems incident to solvent recovery. In addition, carbon tetrachloride is a poor solvent and sulfuryl chloride is very corrosive and requires special equipment. As illustrative of the prior art processes using sulfuryl chloride as a solvent, reference is made to Silberrad, J. Chem. Soc. 127, 2679, 2683–2684 (1925) and PB 792 supra. Fichter and Glantzstein, Ber. 49, 2473–87 (1916) electrolyzed a solution of toluene in a mixture of glacial acetic acid and concentrated hydrochloric acid. The product obtained was such a mixture as to be useless for production purposes. In contrast with this state of the prior art, which shows no entirely satisfactory method of making pentachlorotoluene, it is possible, by means of the invention, to substitute 5 chlorine atoms in the toluene nucleus without affecting (removing or chlorinating) the side chain at temperatures as low as 25° C. and with excellent yields; with xylene, 4 chlorine atoms can be substituted in the nucleus at temperatures as low as 0° C., without affecting either of the methyl groups.

The above difficulties are also typified by the substitutive chlorination of benzene to form hexachlorobenzene $(C_6Cl_6)$. The latter compound has a melting point of 228–231° C. In view of the high melting point of the fully chlorinated compound, it is necessary to resort to high temperatures to keep the product liquid for reaction with gaseous chlorine, and this results in sublimation of the chlorinated benzene and inefficient use of the chlorine. The use of prior art solvents involves the same difficulties mentioned heretofore. In contrast with this, in accordance with the invention, it is possible to substitute six chlorine atoms in benzene at temperatures as low as 40° C. in ordinary iron equipment and without the use of the prior art solvents.

It has been discovered, in accordance with the broadest aspect of the invention, that aromatic compounds and compounds of aromatic character may be substitutively chlorinated in the nucleus, particularly to a high degree, by dissolving said compound in liquid chlorine, and while maintaining the chlorine in a liquid state by suitable adjustment of the temperature and pressure in the reaction vessel, subjecting the solution to reaction conditions, such as the use of suitable temperatures, and in most instances the use of a suitable chloride chlorinating catalyst. This process permits the use of relatively low temperatures, particularly as contrasted with the prior art temperatures for an equivalent degree of chlorination. The liquid chlorine not only acts as the chlorinating agent but also functions as the solvent or medium for the reacting components and in most cases also for the chlorinated products. While it is not intended that the invention should be limited to any theory, it is believed that the solvent action of the liquid chlorine, which acts to bring a high concentration of chlorine into intimate contact with the aromatic compound, may be largely responsible for the desirable results obtained. The chlorination results from a substitution of chlorine for hydrogen attached to a nuclear carbon in the compound with the liberation of hydrogen chloride. The reaction is exothermic, and may proceed until no more hydrogen chloride is liberated under the reaction conditions. The reaction may be stopped at any time by cooling the reaction vessel below the reaction temperature. After the reaction is terminated, the resulting chlorinated compound can be recovered by the evaporation of the liquid chlorine.

At the outset, and before describing the best modes of carrying out the process of the invention, it is believed desirable to point out that there are at least two general types of chlorination processes. In one such type of process, chlorine is added to unsaturated (including aromatic) compounds to convert the compound into a saturated compound. Examples are the conversion of olefins such as ethylene to chlorinated saturated hydrocarbons, and the conversion of aromatic hydrocarbons to chlorinated hydrocarbons of the alicyclic series, such as the chlorination of benzene to hexachloro cyclohexane. I am aware, for instance, that it has been proposed to treat benzene with liquid chlorine in a glass vessel, in the absence of catalyst and in the absence of light, to form chlorinated alicyclic compounds by addition chlorination. In this type of chlorination there is no formation of hydrogen chloride as a by-product. The reaction proceeds with relative ease and, in fact, one of the difficulties in many instances is to prevent it from proceeding too fast. The reaction of these unsaturated aliphatic and aromatic compounds involves considerations peculiar to this type of addition reaction, and the invention is to be distinguished therefrom.

The substitution chlorination process, on the other hand, in which the nuclear hydrogen of an aromatic compound is replaced by chlorine with the formation of hydrogen chloride as a by-product, is an entirely different type of reaction and is to be distinguished from the addition type of chlorination which in general proceeds readily to complete saturation. Substitution chlorination must not destroy the aromaticity of the compound and for this reason is carried out with greater difficulty, especially as the proportion of chlorine in the molecule increases, and involves special chemical considerations not involved in additive chlorination.

My invention is based on the unobvious discovery that aromatic compounds and compounds of aromatic character can have a large proportion or all of the nuclear hydrogen therein substituted by chlorine so as to form very highly chlorinated aromatic compounds, if liquid chlorine is used as the solvent and the chlorinating agent during the reaction and that this high degree of chlorination can be obtained at a relatively low temperature, with ease of control and with a minimum of side reaction.

The invention includes as advantages the use of the same medium as the solvent and chlorinating agent, thus eliminating the need for a separate solvent; the chlorination to a very high degree, including complete chlorination, without resort to high temperatures or pressures; the enhanced contact of the compound to be chlorinated with the chlorine, thus minimizing or eliminating prolonged agitation and long reaction times; the elimination of pyrolytic decomposition in the highly chlorinated products by the use of lower temperatures and the production of products of high purity; the complete nuclear chlorination of aromatic compounds with side chains, a procedure heretofore accomplished only with great difficulty; the ability to use ordinary equipment since enamel and glass lined vessels can be avoided; the control of the reaction and the temperature through self-refrigeration by evaporation of the liquid chlorine solvent; the ability to use such vented gases in a separate prechlorination step to exhaust the chlorine from the hydrogen chloride by-product; the facility with which the process can be operated; and other advantages that will be apparent from a reading of the following description of suitable modes of practicing the invention.

The process of my invention using liquid chlorine as the chlorinating agent and as the solvent or reaction medium may be carried out as a batch operation or as a continuous operation. In a batch type operation either the liquid chlorine or the aromatic compound to be chlorinated may be first added to the reactor. Generally means are provided to assure a solution of the compound in the chlorine in a single homogeneous reaction phase. If the material to be chlorinated is a solid, any expedient may be resorted to for facilitating the introduction of the solid into liquid chlorine, such as by agitation. To facilitate such a controlled introduction, if a solid is to be chlorinated, it may be melted, or it may be dissolved in a small amount of a solvent which may be recovered subsequently. The use of an inert solvent under such circumstances is not excluded provided the conditions are such as to maintain the chlorine in the liquid phase, so as to provide a homogeneous solution comprising the liquid chlorine and the compound to be chlorinated in which the liquid chlorine is the primary solvent. Most of the materials to be chlorinated are sufficiently soluble in liquid chlorine, so that in the preferred embodiment of the invention any solvent other than chlorine is avoided.

The reaction is started preferably by increasing the temperature. The reaction rate is reduced or controlled in most cases through cooling, as explained hereinafter.

In a continuous type process the stream of chlorine and the aromatic compound to be chlorinated may be metered into a reaction zone, the temperature of which may be controlled or varied, and then passed to a chlorine recovery zone.

The proportions of the aromatic compound to be substitutively chlorinated and the liquid chlorine can vary over a relatively wide range. It is important that the amount of chlorine be at least sufficient to dissolve the compound and to provide a single homogeneous liquid phase during the reaction. The amount of chlorine will always be more than the theoretical amount required for chlorination. It is preferred that the amount of chlorine be sufficient to dissolve all of the chlorinated compound obtained at the end of the reaction so that there is no precipitation of the chlorinated product until after the reaction is complete when the chlorine is evaporated for the purpose of recovering the chlorinated compound. Commercial economy suggests the use of the minimum amount of chlorine within the above range.

The reaction is carried out in the presence of a chloride chlorinating catalyst.

Any of the usual chloride chlorinating catalysts may be employed, such as for instance iron chloride, antimony chloride, aluminum chloride, iodine chloride, and sulfur chloride, and aside from the fact that one catalyst may be somewhat better than another in certain reactions, the particular chloride catalyst is not critical. Iron chloride is usually preferred. These may be dissolved or suspended in the solution. They are well known as a group as chloride chlorinating catalysts, and a further description of the constituents in the group is believed unnecessary in view of the knowledge in the art. In some instances elements may be used, such as iron or iodine, which combine with the liquid chlorine to form iron chloride, or iodine chloride, respectively. The amount of the catalyst need not be large and is generally a fraction of 1%.

The chlorination process of the invention may be conducted at any temperature at which the desired reaction proceeds at a suitable rate, depending on the degree of chlorination wanted. For most compounds a temperature within the range of —34° C. (B. P. of liquid chlorine) up to about 80° C. is satisfactory. Usually the lowest temperature is used that will result in the desired amount of chlorination. Higher temperatures and higher corresponding pressures can be used but are not usually necessary or desirable. In some cases, the reaction may be conducted at atmospheric pressure and at a temperature at or below the boiling point of chlorine, i. e., at or below about —34° C.

It appears that a reasonable rate of reaction requires a higher temperature as each additional chlorine is substituted. Thus, for instance, the rate of reaction for substituting the second chlorine in benzene proceeds fairly rapidly at one temperature, but the reaction to substitute the third chlorine proceeds very slowly at this temperature. Upon elevating the temperature, the reaction to substitute the third chlorine proceeds at a reasonable rate, but the reaction to substitute the fourth chlorine is so slow at this elevated temperature as to permit the formation of the trichloro substitution compound almost exclusively. This is true for each additional chlorine substituted. In this way the extent of the chlorination can be controlled largely by selecting the temperature, all other factors and conditions being the same. Since the reactions are exothermic and since relatively low temperature maintenance is important, the ability to reduce the temperature by the self-refrigerating effect obtained upon the evaporation of the liquid chlorine, is an important advantage of the invention.

In all instances the pressure must be such as to maintain the chlorine in the liquid phase at the temperature employed, but higher pressures, such as are obtained by an inert gas or with the hydrogen chloride byproduct, are contemplated as within the invention.

Hydrogen chloride is formed during the reaction and the pressure rises in the reaction vessel because the physical constants of hydrogen chloride are such that it is not condensed to a liquid under the usual reaction conditions, and it is not appreciably soluble in the reaction mixture or in liquid chlorine.

The reaction is exothermic and an increase in temperature and pressure may be prevented or readily controlled, by venting gas from the reaction. If the gas which is a mixture of hydrogen chloride and chlorine is passed through a reflux condenser before venting, a substantial part of the chlorine vapors can be condensed and returned to the reaction vessel. The vented gases will then comprise all of the hydrogen chloride, and a part or substantially none of the chlorine depending on the operation of the reflux condenser.

The temperature may be varied during the chlorination, i. e., it may be raised as the reaction nears the end, for example, by applying heat to the reaction vessel by controlling the amount of evaporation and the operation of the reflux condenser. The chlorination may be continued to the point where the evolution of hydrogen chloride will cease under the chlorination conditions, as indicated by no further increase in the pressure.

At the conclusion of the reaction the chlorine may be separated, for example, it may be evaporated and condensed for reuse, and the chlorinated aromatic compound remains. Generally it is in sufficiently pure condition after the separation of the chlorine so as not to require further purification.

The by-product hydrogen chloride containing some chlorine may be used, for example, in a countercurrent process.

If the by-product hydrogen chloride contains but little chlorine, it may be oxidized to water and chlorine gas and the chlorine recovered and reused in the chlorination process. The hydrogen chloride may be marketed as such or absorbed in water and marketed as hydrochloric acid.

In the substitution chlorination of some aromatic compounds, the reaction to substitute the first chlorine proceeds very rapidly and this portion of the reaction, if it were convenient, could be carried out without the use of a catalyst or even with gaseous chlorine. My invention contemplates, therefore, a process in which the aromatic compounds may be partially chlorinated by means other than with the use of liquid chlorine in accordance with the invention and the chlorination carried further or completed in accordance with the invention. Thus, for instance, benzene may be chlorinated up to the di- or trichloro stage by any known process, but it should not be carried so far as to make the product too hard to handle in the subsequent liquid chlorination. Alternatively, the di or tri product may be purchased as such and the chlorination completed in accordance with the invention. My invention contemplates the chlorination with liquid chlorine of any unchlorinated aromatic compound or any unchlorinated compound of aromatic character to substitute chlorine in the nucleus, or the treatment of any partially chlorinated compound as above defined to increase the chlorine content thereof.

When the process is used in a countercurrent operation, the vented gases containing hydrogen chloride and chlorine, for example, may be used to chlorinate an unchlorinated or lower chlorinated compound, such as benzene or monochlorobenzene through the stage where chlorination readily proceeds with gaseous chlorine. In this way the chlorine is stripped from the hydrogen chloride by-product gas. The partially chlorinated compound is then treated with liquid chlorine in accordance with the invention, to complete the chlorination.

The invention is applicable to aromatic compounds which contain hydrogen attached to a nuclear carbon, which compounds are soluble in liquid chlorine. The compound may be mononuclear or may have two or more condensed or connected rings. All such compounds are liquids or solids under the temperature and pressure reaction conditions. The compounds may be unsubstituted hydrocarbons or may have side chains. The compounds may be partially chlorinated derivatives of all of the above types. Illustrative of the aromatic hydrocarbons that may be used are benzene, toluene, xylene, mesitylene, durene, ethylbenzene, cumene, anthracene, diphenyl, and naphthalene. Other aromatic compounds which may be chlorinated under appropriate reaction conditions are those containing a carboxyl group, such as benzoic acid; compounds containing a nitro or sulfonic group such as nitrotoluene and benzene sulfonic acid; and compounds containing other substituted groups such as the toluidines, quinones, etc. Illustrative of the partially chlorinated derivatives thereof, are dichlorobenzene, monochlorotoluene, benzotrichloride, trichloroethylbenzene, benzyl chloride, dichorodiphenyl, and monochloronitrotoluene.

In order to illustrate and point out some of the advantages of the invention, the following specific embodiments are included. These are for illustrative purposes only and are not to be construed as limitations on the invention as it is otherwise disclosed and claimed herein.

Example 1

460 g. (2 moles) of chlorotoluene approximating tetrachlorotoluene and 12 g. anhydrous FeCl₃ was placed in a suitable metal pressure vessel equipped with a reflux condenser, thermometer well, pressure gauge, and safety disc. This reactor was cooled to about 0° C. and 1320 g. liquid chlorine was added from a pressure cylinder. The temperature was allowed to rise over a period of 45 min. to 42° C. and was maintained for 2½ hours at a temperature between 35–40° C. and gauge pressure of 165–185 lbs. per sq. in. by venting hydrogen chloride gas formed during the reaction. The excess chlorine was then evaporated, the reactor opened and the product removed. After removal it was washed with water to remove the FeCl₃ and dried; the crude pentachlorotoluene had a M. P. of 204–206° C. and the yield was quantitative considering it as pentachlorotoluene. After recrystallization from toluene the product had a melting point of 222°–223° and a chlorine analysis of 67.5% (theoretical: 67.05%).

Example 2

46 g. of toluene was added slowly to a Dewar flask containing 500 ml. of liquid chlorine and 1 g. anhydrous FeCl₃. A reaction took place immediately as evidenced by the evolution of HCl. The reaction was conducted at atmospheric pressure and therefore at about the B. P. of chlorine, i. e., −32 to −33° C. When the reaction was complete as evidenced by no further evolution of HCl, the excess chlorine was evaporated under reduced pressure and 98 g. of mixed chlorotoluenes were obtained from the reaction, indicating that chlorination had proceeded to the trichloro stage. The washed and dried product on analysis gave 53.3% chlorine showing it to be essentially trichlorotoluene (theoretical chlorine for trichlorotoluene: 54.4%).

A comparison of Examples 1 and 2 shows the effect of temperature on the extent of the chlorination.

Example 3

184 g. toluene was placed in the reactor along with 2 g. anhydrous FeCl₃. Gaseous chlorine was passed in at 30–50° C. until 409 g. had been absorbed. Then the reactor and contents were cooled to 0° C.; 3470 g. liquid chlorine was added and the temperature raised to 80° C. in 4 hours, at which temperature it was held for 1 hour. The excess chlorine was evaporated. The crystalline product had a M. P. of 204–228° C. and a chlorine analysis of 74.42%. (Theoretical for hexachlorobenzene: 74.7%; theoretical for pentachlorotoluene: 67.05%.) This shows that the entire methyl group of the toluene can be replaced by Cl under severe conditions, but the use of a lower temperature as in Example 1, and in particular not over 50° C., replaces all of the nuclear hydrogens without affecting the methyl group.

Example 4

In a reaction similar to Example 1 AlCl₃ was substituted for FeCl₃ and the final temperature was carried to 65° where it was held for 4 hours. A portion of product recrystallized from toluene and washed with methanol had a M. P. of 190–219° C., and a Cl₂ content of 66.9%. (Theoretical

Example 5

To a Dewar flask containing 1050 g. liquid chlorine, 3 g. steel wool, and 1 g. anhydrous FeCl₃, 78 g. of benzene was added all at once. The reaction, which started immediately and took place at atmospheric pressure as in Example 2, was substantially complete in 7 hours. The excess chlorine was removed by evaporation under reduced pressure. The product was removed and steam distilled. After drying the product, which consisted of a mixture of liquid and crystals, had a Cl content of 48.6% (theoretical for dichlorobenzene: 48.3%). A portion of the crystals were recrystallized from alcohol and gave a M. P. of 51–53° (p-dichlorobenzene: 53° C.)

Example 6

181.5 g. (1 mole) trichlorobenzene containing 1 g. anhydrous FeCl₃ was added slowly (in 20 min.) under HCl pressure to a suitable metal pressure vessel equipped with a reflux condenser, thermometer well, pressure gauge and safety-disc containing 2150 g. liquid chlorine and 4 g. steel wool at 65° C., and at a pressure corresponding to this temperature which was maintained by venting HCl. When the reaction was complete as evidenced by no further increase in HCl pressure, the temperature was allowed to rise to 70° for 4¼ hours, and it was not necessary to use a higher temperature at any time. Upon evaporation of the excess chlorine there was obtained an almost quantitative yield of hexachlorobenzene M. P. 205–228° C. Upon recrystallization from benzene a product with a M. P. of 224–228° and having a chlorine content of 74.8% was obtained (hexachlorobenzene M. P. 228°—theoretical chlorine: 74.7%).

A comparison of Examples 5 and 6 shows the effect of temperature on the extent of chlorination. At intermediate temperatures, intermediate chlorine contents can be obtained.

Example 7

In a reaction similar to Example 6, 196 g. (1 mole) trichlorotoluene containing 2 g. of iodine (forming $ICl_3$) was added to 2400 g. liquid chlorine in the pressure vessel, no iron present, at 60° C. and held for 1 hour and 10 min. after the addition was complete. The solid remaining in the reactor after the excess chlorine had been discharged had a M. P. of 200–219° C., and a chlorine content of 67.3%. (Theoretical for pentachlorotoluene: 67.05%.)

Example 8

In a reaction as in Example 7 except using 2 g. antimony pentachloride, instead of 2 g. of iodine, there was obtained a crude product M. P. 195–218° C. and a chlorine content of 67.6%. (Theoretical for pentachlorotoluene: 67.05%.)

Example 9

To a Dewar flask containing 300 ml. liquid chlorine, 0.2 g. steel wool and 1 g. anhydrous $FeCl_3$, 21.5 g. ethyl benzene was added. The reaction was conducted at atmospheric pressure as in Example 2. After 12 hours reaction the chlorine was evaporated. The organic liquid was washed with water and distilled. Boiling range: 195–240° C.; Cl content: 40.3% (theoretical for ethyldichlorobenzene: 40.6%). Beilsteins Handbuch der Organische Chemie, vol. V, p. 354, lists the following boiling points for mono and dichloroethylbenzene:

|  | °C. |
|---|---|
| 4 chloro | 180–182 |
| 2,5 dichloro | 213.5 |

Example 10

212 g. ethylbenzene, ½ g. anhydrous $FeCl_3$, 3 g. steel wool were placed in a suitable pressure vessel. Gaseous chlorine was passed through the reactor until 435 g. chlorine had been absorbed. After cooling the vessel to 0° C., 1800 g. liquid chlorine was added and the temperature allowed to rise slowly to 20° C. where it was held for 1 hour 40 min. when it was heated to 25° C. for 20 min. The product was discharged as a liquid chlorine solution and the excess chlorine evaporated. The crude product had a M. P. of 27–55° C. Upon recrystallization from acetone the product had a M. P. of 51–55° C. (Ethylpentachlorobenzene M. P.: 54° C.)

Example 11

In a reaction as in Example 9 except no steel wool was used but only 1 g. $FeCl_3$, and 60 g. (½ mole) cumene (isopropylbenzene) was used instead of ethyl benzene, the chlorine was evaporated at reduced pressure and the product washed with water. Analysis of dried product showed 48.0% Cl. (Theoretical for trichlorocumene: 47.7% Cl.)

Example 12

212 g. (2 moles) p-xylene and 1 g. $FeCl_3$ were added to a pressure vessel containing 4 g. steel wool. Gaseous chlorine was passed through the reactor until 313 g. chlorine had been absorbed. The reactor was cooled to 5° C. and 2200 g. liquid chlorine was added. The temperature was allowed to slowly rise in 1 hour to 15° C. with continuous venting of the evolved hydrogen chloride to maintain a pressure corresponding to this temperature. After 2 hours at 15° C., the excess chlorine was evaporated. The crude product had a M. P. of 160–216° C. Upon recrystallization from toluene a product of M. P. 218–222° C. (2,3,5,6 tetrachloro-p-xylene M. P.: 223°) and 58.4% chlorine content was obtained. (Theoretical for 2,3,5,6 tetrachloro-p-xylene: 58.2% Cl.)

Example 13

119 g. (½ mole) trichloronaphthalene (45.5% Cl, theoretical: 46.0%) and 5 g. steel wool were placed in a suitable pressure reactor and cooled to 0° C. 1950 g. of liquid chlorine was added. Upon warming to about 35° C. a reaction ensued evolving hydrogen chloride. The temperature was increased to 50° C. after ½ hour and maintained at 50° C. for 1½ hours. The excess chlorine was evaporated and the crude product had a melting point of 90 to 120° C. and a chlorine content of 68.7% (theoretical for octochloronaphthalene: 70.3% Cl; theoretical for heptachloronaphthalene: 67.2% Cl).

256 g. (2 moles) naphthalene, 3 g. iron wool, and 1 g. anhydrous $FeCl_3$ were placed in the nickel pressure reactor. A water bottle was arranged in the gas outlet line to absorb evolved hydrogen chloride, gaseous chlorine was passed in at a temperature of 26–89° C. until about three atoms of chlorine per mol of naphthalene had been absorbed as indicated by the amount of hydrogen chloride absorbed in the water bottle. The reactor and contents were cooled to −2° C. and 2900 g. liquid chlorine added. The temperature was gradually raised to 71° C. over a period of 6 hours and 40 minutes. The hydrogen chloride absorbed was equivalent to the replacement of about 7 atoms of hydrogen by chlorine.

Example 14

231 g. (1.5 mols) diphenyl, 2 g. $FeCl_3$ and 3 g. iron wool were placed in the nickel reactor. The reactor was warmed to 65° to melt the diphenyl and gaseous chlorine was passed in at 50–60° C. unitl 420 g. of chlorine had reacted as shown by the amount of hydrogen chloride evolved. The reactor and contents were then cooled to −6° C. 2200 g. liquid chlorine was added and the temperature brought to 30° C. at which temperature a reaction started. The temperature was brought to 60° in 1 hour and maintained at 60–65° for three hours longer, under the pressure at this temperature. The excess chlorine was evaporated leaving a grey crystalline solid, having a setting point of 260–265° C. and a chlorine content of 70.8% (theoretical for decachlorodiphenyl: 71.1%; theoretical for nonochlorodiphenyl: 68.73%). A portion of the product recrystallized from benzene had a M. P. of 290–295° (literature—Ber. 9, 1491 gives above 270° C.).

Example 15

205 g. (1.5 mols) sec-butyl benzene and 4 g. of iodine were placed in the nickel pressure reactor. Gaseous chlorine was passed in at 25–46° C. until the sec-butyl benzene had passed the trichloro stage as shown by the amount of hydrogen chloride evolved. The reactor and contents were then cooled to −6° C. and 2250 g. liquid chlorine added. The temperature was gradually increased over a period of 3¼ hours to 58° C. where it was maintained one hour under the pressure corresponding to this temperature. The contents were discharged and the excess chlorine evaporated. A small amount of solid material was filtered off, leaving an amber oil, the analysis of which showed 61.4% total chlorine and 7.49% alkyl chlorine. The chlorine content of pentachlorobutyl benzene is 57.9%, of chlorobutylpentachlorobenzene 62.5% with 10.4% alkyl. Therefore the product represents a mixture of 24% sec-butyl pentachlorobenzene and 76% sec-chlorobutylpentachlorobenzene.

A comparison of this example with Examples 10 and 11, shows that when a lower temperature is used, such as 25° C., the side chain is not chlorinated, but that a higher temperature results in side chain chlorination also. The latter discovery is the subject matter of a separate application.

Example 16

195.5 g. (1 mol) benzotrichloride ($C_6H_5CCl_3$) and 2 g. of iodine were placed in the nickel pressure vessel and cooled to 0° C. 2650 g. liquid chlorine was added and the temperature brought up to 62° C. over a period of 2¼ hours and held between 62–64° C. for 4½ hours at the pressure corresponding to this temperature. The chlorine solution was discharged and the chlorine was evaporated to give a liquid product containing a small amount of solids. The gain in weight of product over benzotrichloride used indicated an average composition of trichlorobenzotrichloride. It showed a chlorine analysis of 70.1%. Theoretical for trichlorobenzotrichloride: 71.2%.)

The following examples are included as illustrative of the application of the invention to substituted aromatic compounds. The well-known laws of steric hindrance, and the directing effect of various groups in an aromatic nucleus on the introduction of additional substituents, are to be considered in determining the applicability of the invention to different substituted aromatic compounds. (See Frank C. Whitmore: Organic Chemistry, pages 721, 724 and 814.) These principles are well known to the skilled chemist in determining what kinds and types of substituted aromatic compounds may have chlorine substituted for hydrogen in the nucleus. It is not believed that the method of the invention renders it possible, at least in many instances, to accomplish a type of chlorine substitution which is entirely contrary to established chemical principles. Rather, the method of the invention greatly facilitates the speed and ease of reaction in all cases where the known principles would indicate that substitution chlorination in the aromatic nucleus is possible. More particularly, since the invention in general permits the use of lower temperatures to achieve an equilibrium within reasonable lengths of time, it is possible to treat substituted compounds in accordance with the invention to replace hydrogen in the nucleus with chlorine within a reasonable period of time at relatively low temperatures. Thus, in many instances, it may be possible to prepare compounds which could not be made by other processes because the speed of the reaction at low temperatures by such other processes would be too slow for practical purposes, and at higher temperatures decomposition due to other side reactions would have set in.

Out of the great wealth of substituted aromatic compounds which may be chlorinated in accordance with the invention, the following are selected as illustrative examples:

Example 17

99 g. (½ mol) trichlorophenol (2,4,6) and 4 g. steel wool were placed in a suitable metal pressure vessel, which was then cooled to −7° C. 2200 g. of liquid chlorine was then added and the temperature brought up to 30° C. when a hydrogen chloride evolving reaction commenced. The hydrogen chloride was vented to maintain the pressure corresponding to 30° C. After 2 hours and 25 min. the chlorine solution was discharged into a vessel. After evaporation of the excess chlorine there was obtained 144 g. of a product M. P. 43–90° C., consisting of a mixture of pentachlorophenol and hexachlorophenol. This shows that substitution of all of the hydrogens by chlorine in a substituted aromatic compound can be accomplished in accordance with the invention.

Example 18

190.6 g. (1 mol) p-toluene sulfonyl chloride, 2 g. iron wool and 1 g. anhydrous $FeCl_3$ were placed in the nickel autoclave. After cooling the autoclave and contents, 2800 g. of liquid chlorine was added. The temperature was allowed to rise to room temperature and then by heating to 65–68° C. for 4 hours during which time hydrogen chloride equivalent to 1.6 atoms of chlorine was evolved. The excess chlorine was evaporated leaving an orange colored solid. A portion of this was reacted with ammonium hydroxide to form the corresponding p-toluene-sulfonamide. This derivative was found to melt at 123–130° C. and have a Cl content of 17.1% (theoretical: 128° C., and 17.25% Cl for 4-methyl 3-chlorobenzene sulfonamide). This shows the produced toluene sulfonyl chloride to be 3-chloro, 4-methyl benzene sulfonyl chloride.

Example 19

68.5 g. (½ mol) o-nitrotoluene, 2 g. $AlCl_3$ and 2 g. $FeCl_3$, 1900 g. liquid chlorine were introduced into a nickel pressure vessel. A water bottle was arranged in the gas discharge line to absorb all hydrogen chloride evolved. The temperature was elevated to 35° C. when some evidence of reaction was noted. At 40° C. the reaction continued slowly. After 1½ hours of reaction at this temperature, the excess chlorine was evaporated. Analysis of the water showed that 2.06 atoms of chlorine per mol of o-nitrotoluene had reacted. The product was washed with cold acid and water to remove the dissolved metal chlorides and then dried over $CaCl_2$. After filtration a sample was analyzed and showed a chlorine content of 35.7%. (Theoretical for dichloronitrotoluene: 34.5%.)

In view of the foregoing disclosures, variations and modifications thereof will be apparent to one skilled in the art. The invention contemplates all such modifications and variations as come within the scope of the appended claims.

Application Serial No. 67,244, filed December 24, 1948, describes and claims a process utilizing liquid chlorine in the presence of a chloride chlorinating catalyst to replace side chain hydrogen with chlorine in nuclear chlorinated compounds having at least one side chain.

I claim:

1. A process of nuclear substitution chlorination of a compound selected from the group consisting of chlorine-soluble aromatic hydrocarbons having at least one chlorine-replaceable hydrogen attached to a nuclear carbon atom and partially nuclear substitutively chlorinated derivatives thereof, which comprises dissolving said compound in an amount of liquid chlorine in substantial excess of the amount to be reacted with the compound, said excess functioning as the essential liquid solvent medium for the compound throughout the reaction, maintaining said compound and said liquid chlorine in the presence of a chloride chlorinating catalyst at a pressure to keep elemental chlorine in the liquid state at the temperature employed, said temperature being one not over about 80° C. and at which the nuclear substitution chlorination reaction between the compound and the chlorine proceeds as essentially the only reaction, and thereafter removing uncombined liquid chlorine from the chlorinated compound.

2. A process of nuclear substitution chlorination of chlorine-soluble mono-cyclic aromatic hydrocarbons having at least one chlorine-replaceable hydrogen attached to a nuclear carbon atom, which comprises dissolving said compound in an amount of liquid chlorine in substantial excess of the amount to be reacted with the compound, said excess functioning as the essential liquid solvent medium for the compound throughout the reaction, maintaining said compound and said liquid chlorine in the presence of a chloride chlorinating catalyst at a pressure to keep elemental chlorine in the liquid state at the temperature employed, said temperature being one not over about 80° C. and at which the nuclear substitution chlorination reaction between the compound and the chlorine proceeds as essentially the only reaction, and thereafter removing uncombined liquid chlorine from the chlorinated compound.

3. A process of nuclear substitution chlorination of benzene, which comprises dissolving benzene in an amount of liquid chlorine in substantial excess of the amount to be reacted with the benzene, said excess functioning as the essential liquid solvent medium for the benzene throughout the reaction, maintaining said benzene and said liquid chlorine in the presence of a chloride chlorinating catalyst at a pressure to keep elemental chlorine in the liquid state at the temperature employed, said temperature being one not over about 80° C. and at which the nuclear substitution chlorination reaction between the benzene and the chlorine proceeds as essentially the only reaction, and thereafter removing uncombined liquid chlorine from the chlorinated benzene.

4. A process of nuclear substitution chlorination of chlorine-soluble mono-cyclic aromatic hydrocarbons having at least one alkyl side chain and at least one chlorine-replaceable hydrogen attached to a nuclear carbon atom, which comprises dissolving said compound in an amount of liquid chlorine in substantial excess of the amount to be reacted with the compound, said excess functioning as the essential liquid solvent medium for the compound throughout the reaction, maintaining said compound and said liquid chlorine in the presence of a chloride chlorinating catalyst at a pressure to keep elemental chlorine in the liquid state at the temperature employed, said temperature being one not over about 80° C. and at which the nuclear substitution chlorination reaction between the compound and the chlorine proceeds as essentially the only reaction, and thereafter removing uncombined liquid chlorine from the chlorinated compound.

5. A process of nuclear substitution chlorination of toluene, which comprises dissolving toluene in an amount of liquid chlorine in substantial excess of the amount to be reacted with the toluene, said excess functioning as the essential liquid solvent medium for the toluene throughout the reaction, maintaining said toluene and said liquid chlorine in the presence of a chloride chlorinating catalyst at a pressure to keep elemental chlorine in the liquid state at the temperature employed, said temperature being one not over about 80° C. and at which the nuclear substitution chlorination reaction between the toluene and the chlorine proceeds as essentially the only reaction, and thereafter removing uncombined liquid chlorine from the chlorinated toluene.

6. A process of nuclear substitution chlorination of xylene, which comprises dissolving xylene in an amount of liquid chlorine in substantial excess of the amount to be reacted with the xylene, said excess functioning as the essential liquid solvent medium for the xylene throughout the reaction, maintaining said xylene and said liquid chlorine in the presence of a chloride chlorinating catalyst at a pressure to keep elemental chlorine in the liquid state at the temperature employed, said temperature being one not over about 80° C. and at which the nuclear substitution chlorination reaction between the xylene and the chlorine proceeds as essentially the only reaction, and thereafter removing uncombined liquid chlorine from the chlorinated xylene.

7. A process of nuclear substitution chlorination of chlorine-soluble aromatic hydrocarbons having at least one chlorine-replaceable hydrogen attached to a nuclear carbon atom, which comprises dissolving said compound in an amount of liquid chlorine in substantial excess of the amount to be reacted with the compound, said excess functioning as the essential liquid solvent medium for the compound throughout the reaction, maintaining said compound and said liquid chlorine in the presence of a chloride chlorinating catalyst at a pressure to keep elemental chlorine in the liquid state at the temperature employed, said temperature being one not over about 80° C. and at which the nuclear substitution chlorination reaction between the compound and the chlorine proceeds as essentially the only reaction, venting gaseous hydrogen chloride and gaseous chlorine from the reaction mass while maintaining a pressure to keep the chlorine in the liquid state at the temperature maintained, condensing at least a part of the vented gaseous chlorine and returning the condensed liquid chlorine to the reaction zone, and thereafter removing uncombined liquid chlorine from the chlorinated compound.

8. A process of nuclear substitution chlorination of chlorine-soluble aromatic hydrocarbons having at least one chlorine-replaceable hydrogen attached to a nuclear carbon atom, which comprises partially substitutively chlorinating said compound with the vented gaseous chlorine referred to hereinafter, dissolving said partially chlorinated compound in an amount of liquid chlorine in substantial excess of the amount to be reacted with the compound, said excess functioning as the essential liquid solvent medium for the compound throughout the reaction, maintaining said compound and said liquid chlorine in the presence of a chloride chlorinating catalyst at a pressure to keep elemental chlorine in the liquid state at the temperature employed, said temperature being one not over about 80° C. and at which the nuclear substitution chlorination reaction between the compound and the chlorine proceeds as essentially the only reaction, venting gaseous hydrogen chloride and gaseous chlorine from the reaction mass while maintaining a pressure to keep the chlorine in the liquid state at the temperature maintained, and thereafter removing uncombined liquid chlorine from the chlorinated compound.

9. A process of forming pentachlorotoluene, which comprises dissolving partially nuclear substitutively chlorinated toluene in an amount of liquid chlorine in substantial excess of the amount to be reacted with said partially chlorinated toluene, said excess functioning as the essential liquid solvent medium for said partially chlorinated toluene throughout the reaction, maintaining said partially chlorinated toluene and said liquid chlorine in the presence of a chloride chlorinating catalyst at a pressure to keep elemental chlorine in the liquid state at the temperature employed, said temperature being within the range of 35° to 65° C. at which nuclear substitution chlorination between said partially chlorinated toluene and the chlorine proceeds as essentially the only reaction, and thereafter removing uncombined liquid chlorine from the pentachlorotoluene.

FRANCIS EARL LAWLOR.

REFERENCES CITED

The following references are of record in the file of this patent:

FOREIGN PATENTS

| Number | Country | Date |
|---|---|---|
| 837,741 | France | Feb. 20, 1939 |